United States Patent [19]

Gvon et al.

[11] Patent Number: 5,739,296
[45] Date of Patent: Apr. 14, 1998

[54] METHOD AND MATERIALS FOR THERMOSTABLE AND LIGHTFAST DICHROIC LIGHT POLARIZERS

[75] Inventors: Khan Ir Gvon, Dolgoprudnity; Yuri A. Bobrov, Moscow; Victor A. Bykov, Moscow; Leonid Y. Ignatov, Moscow; Tatiana D. Ivanova, Moscow; Sergei I. Popov, Moscow; Elena Y. Shishkina, Moscow; Georgiy N. Vorozhtsov, Moscow, all of Russian Federation

[73] Assignee: Russian Technology Group, San Mateo, Calif.

[21] Appl. No.: 556,917

[22] PCT Filed: May 20, 1994

[86] PCT No.: PCT/US94/05493

§ 371 Date: Nov. 20, 1995

§ 102(e) Date: Nov. 20, 1995

[87] PCT Pub. No.: WO94/28073

PCT Pub. Date: Dec. 8, 1994

[30] Foreign Application Priority Data

May 21, 1993 [RU] Russian Federation ............ 93027586

[51] Int. Cl.$^6$ .................. C09B 31/147; C09B 31/30; C09B 35/50; C09K 19/56; C09K 19/30; C09K 19/34

[52] U.S. Cl. .................. 534/577; 350/347; 350/391; 534/765; 534/815; 544/339; 546/37; 546/49; 549/54

[58] Field of Search .................. 534/577, 765, 534/805; 544/339; 546/37, 49; 549/54; 350/391, 347

[56] References Cited

U.S. PATENT DOCUMENTS

| | | | |
|---|---|---|---|
| 948,204 | 2/1910 | Bohn | 350/391 X |
| 1,873,951 | 3/1932 | Zocher | 350/391 X |
| 1,896,450 | 2/1933 | Lange | 350/391 X |
| 1,963,383 | 6/1934 | Rogers | 260/57 |
| 1,993,660 | 3/1935 | Goodrich et al. | 350/391 X |
| 2,005,041 | 6/1935 | Krauss et al. | 260/53 |
| 2,286,570 | 6/1942 | Pollack | 350/391 X |
| 2,311,840 | 2/1943 | Land | 350/391 X |
| 2,359,456 | 10/1944 | Young | 350/391 X |
| 2,396,582 | 3/1946 | Lecher et al. | 260/263 |
| 2,400,877 | 5/1946 | Dreyer | 350/391 X |
| 2,403,226 | 7/1946 | Lecher et al. | 260/323 |
| 2,420,279 | 5/1947 | Young | 350/391 X |
| 2,432,867 | 12/1947 | Dreyer | 350/391 X |
| 2,464,954 | 3/1949 | Werth | 350/391 X |
| 2,481,830 | 9/1949 | Dreyer | 350/391 X |
| 2,484,818 | 10/1949 | Dreyer | 350/391 X |
| 2,487,063 | 11/1949 | Marks | 350/391 X |
| 2,524,286 | 10/1950 | Dreyer | 350/391 X |
| 2,544,659 | 3/1951 | Dreyer | 350/391 X |
| 2,553,961 | 5/1951 | Dreyer | 350/391 X |
| 2,562,895 | 8/1951 | Dreyer | 350/391 X |
| 2,603,129 | 7/1952 | Dreyer | 350/391 X |
| 2,617,329 | 11/1952 | Dreyer | 350/391 X |
| 2,766,244 | 10/1956 | Brouillard | 260/272 |
| 2,774,761 | 12/1956 | Hardy | 260/274 |
| 2,776,598 | 1/1957 | Dreyer | 350/391 X |
| 2,915,936 | 12/1959 | Winchell | 350/391 X |
| 2,915,937 | 12/1959 | Winchell | 350/391 X |
| 3,171,843 | 3/1965 | Weisshauer et al. | 260/372 |
| 3,235,631 | 2/1966 | Shelanski | 350/391 X |
| 3,386,843 | 6/1968 | Jaffe et al. | 350/391 X |
| 3,426,728 | 2/1969 | Dreyer et al. | 350/391 X |
| 3,459,839 | 8/1969 | Huttles | 350/391 X |
| 3,520,752 | 7/1970 | Dreyer | 350/391 X |
| 3,592,526 | 7/1971 | Dreyer | 350/391 X |

(List continued on next page.)

FOREIGN PATENT DOCUMENTS

| | | | |
|---|---|---|---|
| 0653309 | 12/1962 | Canada | 260/241 |
| 0 168 498A1 | 2/1984 | European Pat. Off. | 350/391 |
| 0 168 498 | 1/1986 | European Pat. Off. | 350/391 |
| 0 299509 A2 | 1/1989 | European Pat. Off. | 350/391 |
| 0 300 770 | 1/1989 | European Pat. Off. | 350/391 |
| 0 348964 A2 | 1/1990 | European Pat. Off. | 350/391 |
| 0348 964 A2 | 1/1990 | European Pat. Off. | 350/391 |
| 0 366 803 | 5/1990 | European Pat. Off. | 350/391 |
| 0 383 932 | 8/1990 | European Pat. Off. | 350/391 |
| 0 395019 A2 | 10/1990 | European Pat. Off. | 350/391 |
| 0444703 A3 | 9/1991 | European Pat. Off. | 350/391 |
| 0 482 620 | 4/1992 | European Pat. Off. | 350/391 |
| 0 488 544 | 6/1992 | European Pat. Off. | 350/391 |
| 0 198 082 | 7/1992 | European Pat. Off. | 350/391 |
| 0 518 425 | 12/1992 | European Pat. Off. | 350/391 |
| 0 342 241 | 3/1993 | European Pat. Off. | 350/391 |
| 0 531 569 A1 | 3/1993 | European Pat. Off. | 350/391 |
| 0 532809 A1 | 3/1993 | European Pat. Off. | 350/391 |
| 0530 106 A1 | 3/1993 | European Pat. Off. | 350/391 |
| 0 549 342 | 6/1993 | European Pat. Off. | 350/391 |
| 0 403 711 | 12/1993 | European Pat. Off. | 350/391 |

(List continued on next page.)

OTHER PUBLICATIONS

Langhals, "Water–soluble perylenetetracarboxylic acid bisimide fluorescent dyes," 1988, *Chemical Abstracts*, vol. 109 pp. 67–68.

Primary Examiner—Floyd D. Higel
Attorney, Agent, or Firm—Skjerven, Morrill, MacPherson, Franklin & Friel; Michael Shenker; Bernard Berman

[57] ABSTRACT

Polarizing coatings are formed from dyestuffs which provide a stable liquid crystalline phase in a wide range of concentrations, temperatures and pH-values. Particles formed by aggregates of the liquid crystal molecules are oriented in a predetermined direction to polarize light. The stability of the liquid crystalline state allows orienting the particles by mechanical forces such as a shearing force applied when the liquid crystal (10) is spread on a support surface (20) by a knife-like doctor (90) or a tension deformation force acting on the meniscus of the liquid crystal deposited between two surfaces (20, 30) as the surfaces are peeled off one another. As a result, the polarizing coatings are formed in some embodiments by simple methods. In some embodiments, the polarizing coatings have a high lightfastness, a high thermal stability, and a high dichroic ratio.

29 Claims, 4 Drawing Sheets

U.S. PATENT DOCUMENTS

| | | | |
|---|---|---|---|
| 3,635,543 | 1/1972 | Collins | 350/391 X |
| 3,658,616 | 4/1972 | Dreyer | 350/391 X |
| 3,663,089 | 5/1972 | Makas | 350/391 X |
| 3,711,182 | 1/1973 | Jasgur | 350/391 X |
| 3,833,289 | 9/1974 | Schuler | 350/391 X |
| 3,888,863 | 6/1975 | Troster | 260/281 |
| 3,914,016 | 10/1975 | Dreyer | 350/391 X |
| 3,941,901 | 3/1976 | Harsch | 350/391 X |
| 3,970,362 | 7/1976 | Laliberte | 350/391 X |
| 3,985,425 | 10/1976 | Clapp | 350/391 X |
| 4,123,141 | 10/1978 | Schuler | 350/391 X |
| 4,133,775 | 1/1979 | Bloom | 350/391 X |
| 4,209,822 | 6/1980 | Goodbar | 350/391 X |
| 4,219,867 | 8/1980 | Zehender | 350/391 X |
| 4,261,656 | 4/1981 | Wu | 350/391 X |
| 4,328,532 | 5/1982 | Smith | 350/391 X |
| 4,473,277 | 9/1984 | Brown | 350/391 X |
| 4,579,423 | 4/1986 | Fergason | 350/334 |
| 4,592,623 | 6/1986 | Yamamoto et al. | 350/391 X |
| 4,685,771 | 8/1987 | West et al. | 350/347 |
| 4,692,189 | 9/1987 | Babler et al. | 106/308 |
| 4,780,531 | 10/1988 | Kano et al. | 534/577 |
| 4,796,160 | 1/1989 | Khan | 350/391 X |
| 4,802,745 | 2/1989 | Okada et al. | 350/391 X |
| 4,803,014 | 2/1989 | Okumura et al. | 350/391 X |
| 4,842,781 | 6/1989 | Nishizawa et al. | 350/391 X |
| 4,859,039 | 8/1989 | Okumura | 350/391 X |
| 4,877,313 | 10/1989 | Saxe et al. | 350/391 |
| 4,895,677 | 1/1990 | Okumura et al. | 350/391 X |
| 4,974,946 | 12/1990 | Solomon | 350/391 X |
| 4,992,218 | 2/1991 | Sugio et al. | 350/391 X |
| 5,002,701 | 3/1991 | Saxe | 350/391 X |
| 5,004,327 | 4/1991 | Rosen | 350/391 X |
| 5,007,942 | 4/1991 | Claussen et al. | 350/391 X |
| 5,033,829 | 7/1991 | Faroughy | 350/391 X |
| 5,050,961 | 9/1991 | Venolia | 350/391 X |
| 5,059,356 | 10/1991 | Nakamura et al. | 350/391 X |
| 5,071,234 | 12/1991 | Amano et al. | 350/391 X |
| 5,073,014 | 12/1991 | Ostoja-Starzewski | 350/391 X |
| 5,082,601 | 1/1992 | Okada et al. | 350/391 X |
| 5,093,041 | 3/1992 | Check, III et al. | 350/391 X |
| 5,101,296 | 3/1992 | Bell | 350/391 X |
| 5,115,341 | 5/1992 | Bentley | 350/391 X |
| 5,130,057 | 7/1992 | Saxe | 350/391 X |
| 5,158,348 | 10/1992 | Sakamoto et al. | 350/391 X |
| 5,164,856 | 11/1992 | Zhang et al. | 350/391 X |
| 5,177,635 | 1/1993 | Keilmann | 350/391 X |
| 5,248,774 | 9/1993 | Dietz et al. | 544/125 |

FOREIGN PATENT DOCUMENTS

| | | | |
|---|---|---|---|
| 2 297 927 | 4/1994 | European Pat. Off. | 350/391 |
| 0 425 344 | 5/1994 | European Pat. Off. | 350/391 |
| 0 428 213 | 7/1994 | European Pat. Off. | 350/391 |
| 0 357 946 | 8/1994 | European Pat. Off. | 350/391 |
| 2 432 180 | 2/1980 | France | 350/391 |
| 2 437 632 | 4/1980 | France | 350/391 |
| 2 531 235 | 2/1984 | France | 350/391 |
| 2 616 360 | 12/1988 | France | 350/391 |
| 2 676 285 | 11/1992 | France | 350/391 |
| 52-22898 | 2/1977 | Japan | 350/391 |
| 52-37783 | 9/1977 | Japan | 350/391 |
| 56-138715 | 10/1981 | Japan | 350/391 |
| 56-52284 | 11/1981 | Japan | 350/391 |
| 57-155509 | 9/1982 | Japan | 350/391 |
| 57-168204 | 10/1982 | Japan | 350/391 |
| 58-50501 | 3/1983 | Japan . | |
| 58-85405 | 5/1983 | Japan | 350/391 |
| 58-102204 | 6/1983 | Japan | 350/391 |
| 58-102205 | 6/1983 | Japan . | |
| 59-218408 | 12/1984 | Japan | 350/391 |
| 60-26304 | 2/1985 | Japan | 350/391 |
| 60-168743 | 9/1985 | Japan | 350/391 |
| 60-169803 | 9/1985 | Japan | 350/391 |
| 60-205416 | 10/1985 | Japan | 350/391 |
| 60-230606 | 11/1985 | Japan | 350/391 |
| 61-255304 | 11/1986 | Japan | 350/391 |
| 62-96905 | 5/1987 | Japan | 350/391 |
| 63-44201 | 2/1988 | Japan | 350/391 |
| 1-70702 | 3/1989 | Japan | 350/391 |
| 1-93702 | 4/1989 | Japan | 350/391 |
| 1-93703 | 4/1989 | Japan | 350/391 |
| 1-172906 | 7/1989 | Japan | 350/391 |
| 1-183602 | 7/1989 | Japan | 350/391 |
| 1-702907 | 7/1989 | Japan | 350/391 |
| 1-227101 | 9/1989 | Japan . | |
| 1-227102 | 9/1989 | Japan | 350/391 |
| 1-227103 | 9/1989 | Japan | 350/391 |
| 1-248105 | 10/1989 | Japan | 350/391 |
| 2-7002 | 1/1990 | Japan | 350/391 |
| 3-12606 | 1/1991 | Japan | 350/391 |
| 3-78703 | 4/1991 | Japan | 350/391 |
| 3-89202 | 4/1991 | Japan | 350/391 |
| 3-89203 | 4/1991 | Japan | 350/391 |
| 3-94204 | 4/1991 | Japan | 350/391 |
| 3-96901 | 4/1991 | Japan | 350/391 |
| 3-130702 | 6/1991 | Japan | 350/391 |
| 1-97104 | 3/1992 | Japan | 350/391 |
| 4-93903 | 3/1992 | Japan | 350/391 |
| 4-123008 | 4/1992 | Japan | 350/391 |
| 4-158305 | 6/1992 | Japan | 350/391 |
| 4-362553 | 12/1992 | Japan | 350/391 |
| 4-362554 | 12/1992 | Japan | 350/391 |
| 4-362902 | 12/1992 | Japan | 350/391 |
| 4-371903 | 12/1992 | Japan | 350/391 |
| 0236695 | 7/1945 | Switzerland | 544/340 |
| 0236696 | 7/1945 | Switzerland | 544/339 |
| 0537592 | 6/1941 | United Kingdom | 544/339 |
| 2175707 | 12/1988 | United Kingdom | 350/391 |
| 2233020 | 1/1991 | United Kingdom | 350/391 |
| 2240852 | 8/1991 | United Kingdom | 350/391 |
| 2 256 725 | 12/1992 | United Kingdom | 350/391 |
| WO 85/03140 | 7/1985 | WIPO | 350/391 |
| WO 87/04264 | 7/1987 | WIPO | 350/391 |
| WO 88/02871 | 4/1988 | WIPO | 350/391 |
| WO 89/11673 | 11/1989 | WIPO | 350/391 |
| WO 91/07674 | 5/1991 | WIPO | 350/391 |
| WO 92/22838 | 12/1992 | WIPO | 350/391 |
| WO 93/14425 | 7/1993 | WIPO | 350/391 |
| WO 93/14426 | 7/1993 | WIPO | 350/391 |
| WO 93/14427 | 7/1993 | WIPO | 350/391 |

-continued

Formula II:

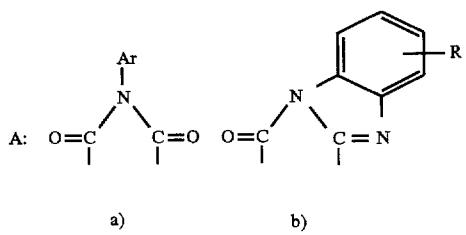

where:

R is H, an alkyl group, a halogen, or an alkoxy group;

Ar is a substituted or unsubstituted aryl radical;

n=2–3;

M is as in formula I above.

Formula III:

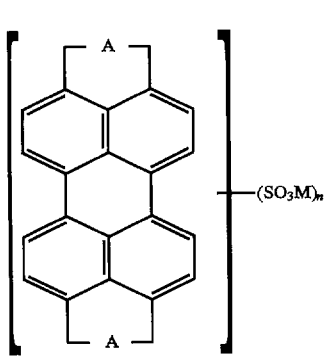

where A, M, n are as in formula II above.

Formula IV:

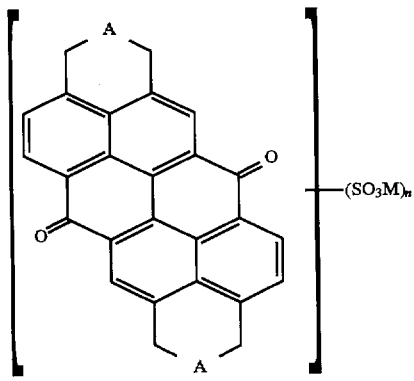

where A, M, n are as in II above.

Formula V:

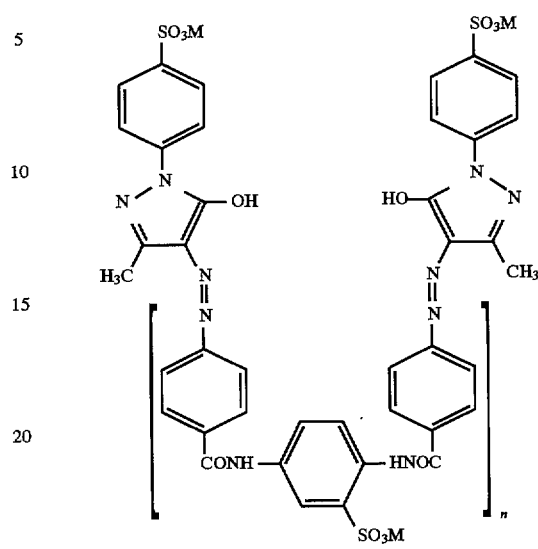

where M is as in I above, and n=3–5.

Formula VI:

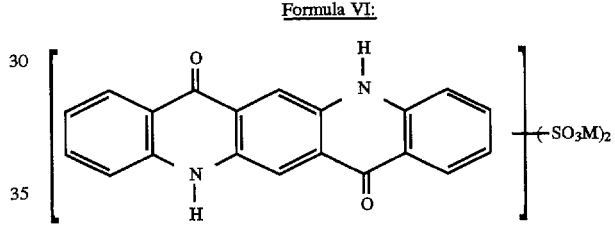

where M is as in I above.

Formula VII:

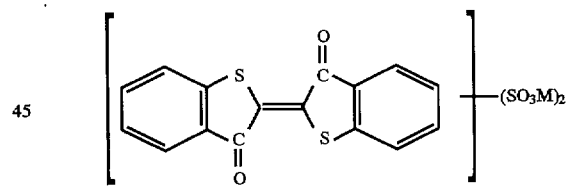

where M is as in I above.

In some embodiments of type I compounds, one or more of relations (1), (2) and (3) hold true, wherein:

(1): Alk is an alkyl group with one to four carbon atoms, preferably with 1 to 2 carbon atoms ($CH_5$, $C_2H_5$).

(2): Ar is a substituted or unsubstituted phenyl radical; a suitable substituent for the phenyl radical is Cl. Thus in some embodiments, Ar is $C_6H_5$ or $4\text{-ClC}_6H_4$.

(3): $M = H^+$, $Li^+$, $Na^+$, $K^+$, $Cs^+$, or $NH_4^+$.

In some embodiments of the compounds of formulas II–VII, one or more of relations (3), (4) and (5) hold true, wherein:

(4): R=H; or an alkyl group with 1 to 4 carbon atoms and preferably with 1 to 2 carbon atoms ($CH_3$, $C_2H_5$); or an alkoxy group with 1 to 2 carbon atoms (preferably methoxy $CH_3O$); or Br; or Cl.

(5): Ar is a substituted or unsubstituted phenyl radical. Thus, in some embodiments, Ar is $C_6H_5$, $4\text{-CH}_3OC_6H_4$ ($CH_3O$ is a substituent), $4-C_2H_5OC_6H_4$, $4-ClC_6H_4$, $4-C_4H_9C_6H_4$, or $3-CH_3C_6H_4$.

The present invention also provides processes for liquid crystal orientation. In some embodiments, the processes allow combining the liquid crystal (LC) orientation and application on the surface into one stage so as not to require effecting an anisotropy of the support surface before the LC application. In some embodiments, the LC is applied between two surfaces. Then the surfaces are separated. During separation, a wedging force between the surfaces induces tension deformation of the LC meniscus in the region of separation. The tension of the thin LC layer causes uniform orientation of the LC molecules. In some embodiments, a shearing force is used to orient the molecules.

In some embodiments, other chromogens of diazo- and polycyclic classes are used than the ones from the formulas I–VII. The chromogens are such that the dyestuffs can form a stable liquid crystalline state in water.

Other features and embodiments of the invention are described below. The invention is defined by the appended claims.

DESCRIPTION OF THE PREFERRED EMBODIMENTS

Figure 1A:
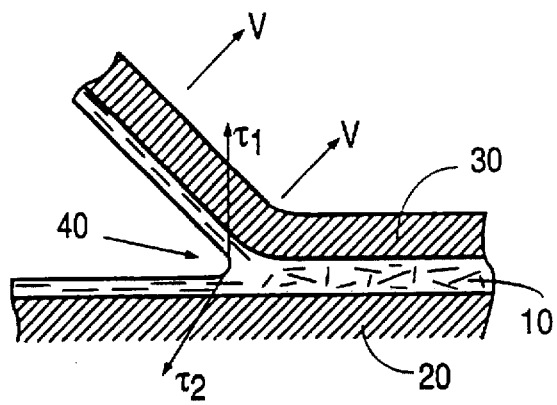
FIG. 1a is cross-section illustration of a liquid crystal applied on a hard flat support surface and covered by a flexible film during the liquid crystal orientation as the flexible film is being peeled off the hard surface.

This invention uses water soluble organic dyestuffs of the formula {Chromogen} $(SO_3M)_n$ and their mixtures. The chromogen is such that the dyestuff is capable of existing in a liquid crystalline phase. M is $H^+$, $NH_4^+$, or a metal of the first group. In some embodiments, M is a monovalent cation which is one of $Li^+$, $Na^+$, $K^+$, $Cs^+$. In some embodiments, water soluble organic dyes of types I–VII or their salts and mixtures are used which, as we have found, form stable lyotropic liquid crystalline phases (nematic and hexagonal phases and their mixtures) within a wide range of concentrations, temperatures and pH-values. In some embodiments, other chromogens of diazo- and polycyclic classes are used such that the dyestuffs can form a stable liquid crystalline state in water. In some embodiments, the lyotropic LC can exist in a concentration range of about 5 mass. % to about 25 mass. % depending on the dyestuff. In some embodiments of the dyestuffs of formulas I, III, IV and V the lyotropic LC can exist in a concentration range of about 8 mass. % to about 12 mass. %, and for dyes of type II, VI and VII of about 16 mass. % to about 20 mass. %. A suitable temperature range in which the lyotropic LC an exist is in some embodiments from about 5° C. about 40° C., from about 20° C. to about 30° C. in some embodiments.

The pH-values for the lyotropio LC are in some embodiments in the range of 1 to 9, of 4 to 6 in some embodiments.

Some of the compounds or types I–VII were used in non-polarizing situations. Others are novel compounds. The previously known compounds include: the compound of formula I: $R=R^1=H$ (see German Patent 21689 (1908), Frdl. 9, p. 782, incorporated herein by reference), formula III: A=a (where "a" is defined in formula II above), Ar=3-$HSO_3C_6H_4$- (German Patent No. 3703513.4 whose disclosure is hereby incorporated herein by reference), formula V (direct yellow lightfast "0" in "Organic Synthetic dyes", Catalog, Cherkassy, 1984 incorporated herein by reference), formula VI (U.S. Pat. No. 3,386,943 incorporated herein by reference). The water-soluble organic dyestuffs of formulas I–IV, VI and VII are obtained by direct sulfonation of corresponding polycyclic water-insoluble compounds in the case of formulas I–III, VI and VII, or by sulfonation and simultaneous cycling in the case of formula IV.

The LC stability within a wide range of concentrations, temperatures and pH-values allows realizing a radically different method of lyotropic LC orientation. The method is based on use of mechanical forces for crystal orientation, for example, of a shearing force or of forces inducing a tension deformation of the meniscus formed in the region of wedging separation of two surfaces between which the LC layer is spread. In some embodiments, these methods are simple, they provide good orientation, and they do not require a support surface anisotropy.

The process of dichroic polarizers preparation includes transfer of water-soluble organic dyestuffs into the liquid crystalline phase, application of the liquid crystal thus obtained to the substrate surface and simultaneous mechanical orientation of the liquid crystal molecules, and then solidification of the dyestuff film by solvent evaporation.

It is well known that liquid crystals (LC) are oriented when subjected to a shearing force. See H. G. de Gene, "The Physics of Liquid Crystals", Clarendon Press, Oxford, 1974, Part 5.2.1 incorporated herein by reference. For thermotropic LC such orientation disappears when the shearing force is discontinued. For lyotropic LC, the fixation of the oriented state is possible owing to solvent evaporation from a dyestuff solution film applied on the support surface and following solidification of the film. According to aforementioned U.S. Pat. Nos. 2,400,877 and 2,544,659 the nematic lyotropic LC is not stable and is formed on the support surface during solvent evaporation from the solution deposited on the support surface. The rate of drying of the isotropic dye solution from the support surface is an important factor. Too fast drying leads to boiling of the solution, and too slow drying causes crystallization such that the LC phase does not form at all or forms only for a short period of time. Hence even if the LC phase is entered, it exists only for a short time. Therefore the orientation of the dye LC by subjecting the LC to a shearing force is not done in this case.

Due to the fact that dyestuffs of types I–VII form stable lyotropic LC, these dyestuffs can be oriented on the support surface by a mechanical shift, that is, by a shearing force. The shift can be carried out simultaneously with the application of dye LC on the support surface.

In contrast with thermotropic LC in which the molecular orientation is lost when the shearing force is removed, the orientation in lyotropic LC can be preserved quite well for a long time due to the high viscosity of such LC. As a result, a high optical anisotropy is achieved when the solvent evaporates and the LC solidifies.

Water-miscible low molecular weight organic compounds (acetone, alcohols, dioxane etc.), antioxidants and/or inhibitors and/or surface active agents and/or film forming agents may be used with the polarizers according to methods known in the art. See, for example, U.S. Pat. No. 2,400,877 incorporated herein by reference.

Low molecular weight organic compounds (acetone, alcohols, dioxane type) as additives for viscosity reduction of composition provide uniformity of polarizing coatings application. Use of surface active and film forming agents provides uniformity of coating due to the increased wettability of the support surface.

Antioxidants and inhibitors are added to the dyestuffs in some embodiments to provide chemical stability of the polarizing coatings to external action including adhesives and lacquers.

FIG. 1a illustrates an LC application process in which the LC is oriented by forces inducing tension deformation at the LC meniscus formed at wedging separation of two surfaces between which an LC layer is spread. LC layer 10 is applied on a hard flat support surface 20 and covered by an accessory film 30 which is a polymeric film in some embodiments. Spacers (not shown) between films 20 and 30 maintain a predetermined thickness of LC layer 10. Then film 30 is peeled off at some velocity V which is a constant velocity in some embodiments. When film 30 is being peeled off, a wedging force acts on LC layer 10 in the region 40 in which film 30 separates from surface 20. This force creates tension deformation that stretches the LC 10 meniscus in the direction $\tau_1$, $\tau_2$. Dyestuff molecules in the LC combine to form thread-like aggregate particles (supra-molecular complexes), and the tension in the thin LC layer orients these particles along the stretching direction $\tau_1$, $\tau_2$. At the same time the dyestuff molecules orient transversely to this direction. (In some embodiments, the molecular planes in each particle and the moments of electron transition are perpendicular to the longitudinal axis of the particle or form an angle close to 90° with the axis.) As the separation region moves right in FIG. 1a, the aggregate particles become oriented by the tension horizontally left to right. Due to the light absorption by the particles, the light transmitted through the resulting polarizing coating will be polarized in the vertical plane parallel to the particles.

During application, the LC is additionally oriented in some embodiments by constant electric or magnetic fields (not shown).

Figure 1B:
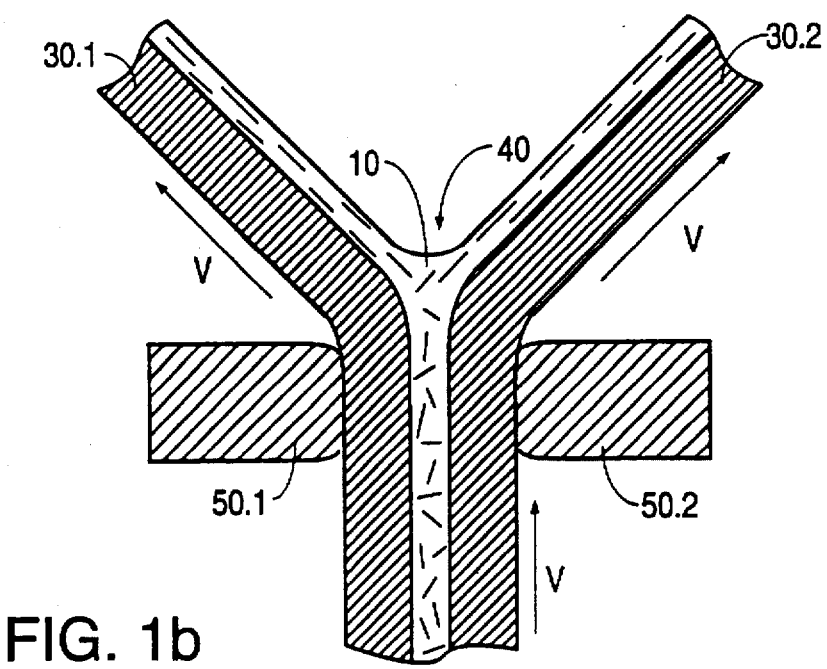
FIG. 1b is a cross-section illustration of a liquid crystal between two flexible films as the films are being separated from each other to orient the crystal coating on each film.

FIG. 1b illustrates another LC application process in which polarizing coatings are formed simultaneously on two polymeric films 30.1, 30.2. Films 30.1, 30.2 are spread between units 50.1, 50.2. LC 10 is applied between the films. The two films are then pulled up by their upper ends in different directions so that the films separate at the top edges of units 50.1, 50.2. The LC layers on both films get oriented by a wedging force that produces a tension deformation in the meniscus region 40 where the films separate, in a similar manner to the process of FIG. 1a.

In some embodiments, units 50.1, 50.2 are cylinders that rotate around axes parallel to the surfaces of films 30.1, 30.2 as the films are pulled up. LC 10 is applied as follows before the films are pulled up. The top edges of the films are brought above the cylinders 50.1, 50.2 and are spread out at the angles at which the films are later pulled up. LC 10 is applied from the top between the films. The distance by which LC 10 leaks down the films depends on the LC viscosity and on the distance between the two films in the area below the top edges of cylinders 50.1, 50.2.

Polarizing coatings are applied in some embodiments on different kinds of substrates including plastics, silicate glass, silicon, metal. The substrates may have different sizes and hardnesses. A suitable LC application process may depend on the substrate type.

Figure 2:
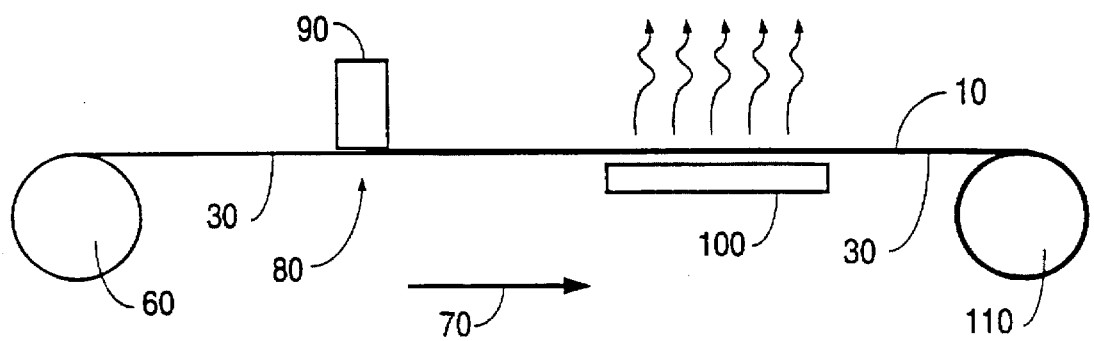
FIG. 2 illustrates an application of a liquid crystal on a polymeric film by a "roll to roll" type process.

FIG. 2 illustrates a "roll to roll" type application process suitable for forming a polarizing coating on a flexible film 30. Film 30 which is a polymeric film in some embodiments is unrolled from a feeding roll 60. Film 30 moves horizontally in the direction of arrow 70. Liquid crystal 10 is deposited in the region 80 by an application unit schematically shown at 90. Several embodiments of unit 90 are illustrated in FIGS. 3a–3d and are described below. LC 10 is deposited and oriented as the film 30 moves under unit 90. LC 10 is dried with the aid of heater 100 at about 20° C. to about 80° C. Forced air or inert gas is also used in some embodiments to accelerate drying. Film 30 with the dry coating 10 over it is taken up by taking roll 110.

Figure 3A:
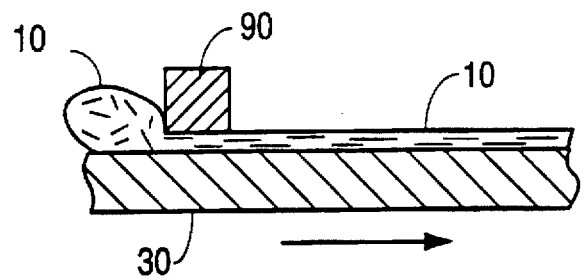
FIGS. 3a–3d illustrate application units in some embodiments of the process of FIG. 2.

In FIG. 3a, application unit 90 is a knife-type doctor. The bottom surface of unit 90 is slightly rounded. LC 10 is deposited immediately to the left of unit 90. As film 30 with liquid crystal 10 passes under unit 90, a shearing force ("mechanical shift" force) acts on the liquid crystal under unit 90 in the direction opposite to the direction of motion of film 30. As a result, the liquid crystal particles get oriented left to right.

Figure 3B:
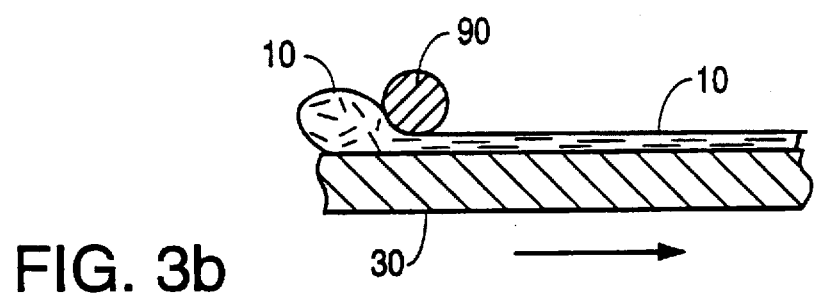

In FIG. 3b, application unit 90 is a non-revolving cylinder. The LC orientation occurs similarly to FIG. 3a.

In some embodiments, another revolving or non-revolving cylinder (not shown) is positioned below film 30 and in contact with film 30 to set the distance between film 30 and application unit 90 and thus to set the thickness of the polarizing coating.

Figure 3C:
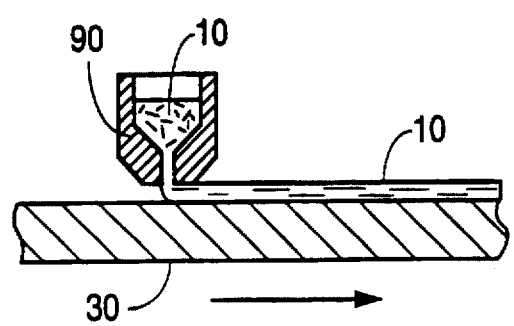

In FIG. 3c, application unit 90 is a drawplate. Liquid crystal 10 is poured into the drawplate and is applied through a hole (chink) at the bottom of the drawplate as film 30 moves past the drawplate. The liquid crystal aggregate particles are oriented by the shearing force applied by the working (bottom) surface of the drawplate, similarly to the cases of FIGS. 3a, 3b.

Figure 3D:
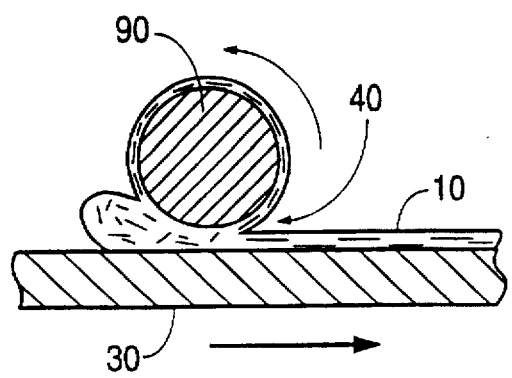

In FIG. 3d, application unit 90 is a rolling cylinder that revolves counter-clockwise. Liquid crystal 10 is deposited immediately to the left of the cylinder. The liquid crystal particles get oriented by the tension force acting on the LC meniscus in the region 40 where the cylinder surface moves up and away from film 30. See the discussion above in connection with FIG. 1a.

In some embodiments of FIGS. 2 and 3a–3d, spacers (not shown) are placed under the application unit 90 to set the thickness of the polarizing coating to a desired value. In some embodiments, the spacers are mounted on the edges of unit 90, for example, on the edges of the cylinders of FIGS. 3b, 3d.

The thickness of the polarizing coatings ranges in some embodiments from about 0.1 mkm (micrometers) to about 1.5 mkm, from about 0.4 mkm to about 0.8 mkm in some embodiments. In some embodiments, larger thicknesses are obtained by depositing several layers of polarizing coatings.

In some embodiments, before LC is applied, the surface of film 30 is cleaned by well known techniques, for example, plasma chemical techniques or corona discharge. Additional operations, for example, transfer of the dyestuff layer into a water insoluble form or applying an adhesive or lacquered protective layer, are carried out in some embodiments, if needed, by a "roll to roll" type process using any suitable standard equipment.

Similar processes are used to form polarizing coatings on plates (that is, non-flexible substrates) and sheets (that is, flexible substrates) of materials. The taking and feeding rolls are not used because such substrates are not flexible enough to be rolled into a roll. The substrate surface 30 moves from left to right essentially as shown in FIG. 2. In some embodiments, the substrate 30 does not move, but application unit 90 moves from right to left. The polarizing coating to the right of unit 90 is dried at 20°–80° C., preferably with forced air or inert gas.

The above processes of polarizing coatings application allow applying a dyestuff layer simultaneously with carrying out uniform orientation of the dyestuff molecules.

In some embodiments, polygraphic methods such as relief or intaglio printing are used to perform the above LC application processes.

In some embodiments, in order to transfer the polarizing coatings into an insoluble state they are treated with solutions of bivalent metal salts (for example, BaCl$_2$, CaCl$_2$), trivalent metal salts (for example, AlCl$_3$), or tetraalkylammonium salts (for example, benzyl-dimethyl-cetylammonium chloride). Bivalent and trivalent metals that form complex compounds are suitable in some embodiments. Methods of making such salt solutions are well known in the art. The treatment is performed by immersing the substrate with the polarizing coating into a salt solution and then washing the coating with pure water.

In some embodiments, polarizing coatings on polymeric films (polyethylene terephthalate, polycarbonate, triacetylcellulose and other transparent film materials) provide flexible polarizing films having the following advantages over the polarizing films described in the aforementioned U.S. Pat. Nos. 5,007,942 and 5,059,356. The lightfastness is high (6–7 rating on the 8-rating scale). The thermal stability of the polarizing coating is increased to 200°–300° C. and the thermal stability of the polarizing film is limited only by the thermal stability of the polymeric support. These advantages allow the polarizing films of the invention to be used in new fields of science and engineering.

The polarizing coating can be protected from mechanical destruction by a transparent layer of lacquer or adhesive or by a laminated structure. Use of a transparent adhesive makes it possible to attach the polarizer to any surface.

The polarizing coating can be applied on a hard flat, spherical or cylindrical, transparent or reflecting surface, and in particular on inorganic or organic glass, on silicate glass spray-coated by a semiconductor layer, and on a silicon plate covered with a sprayed aluminum layer. The obtained polarizing plate can be used for constructing a liquid crystalline cell with an internal polarizer. The polarizing coating on the plate has an orienting influence on the liquid crystal filling the cell. This allows omitting an additional orienting layer used with conventional polarizers. New polarizers in the design of the LC cell permit to eliminate image doubling in displays at a large angle of vision.

Figure 4:
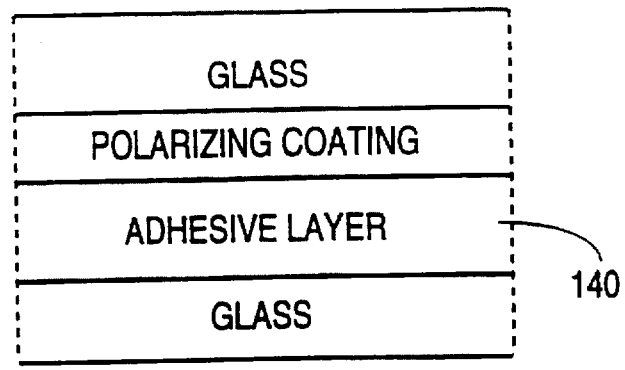
FIGS. 4 and 5 are schematic illustrations of laminated plates that include a polarizing coating between two glass plates.

Our new polarizers can be successfully used for manufacturing laminated flat glass that includes two glass plates as shown in FIG. 4. The top glass plate is coated with a polarizer. The two glass plates are glued together with a transparent polymeric adhesive 140, for example, polyvinylbutyral.

Figure 5:
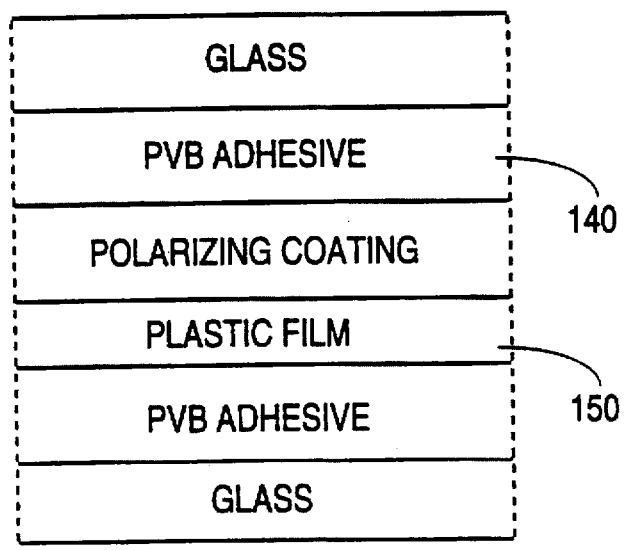

A laminated linearly polarizing plate using two plates of glass is shown in FIG. 5. Between these two plates of glass a polymeric film 150 is placed with a polarizing coating applied on it. The above mentioned layers are glued together by transparent polymeric adhesive 140 (polyacrylate, polyvinylbutyral, etc.) according to the conventional manufacturing technology for laminated glasses. Optimal gluing temperatures of about 140° C. to about 180° C. can be used in some embodiments where the thermal stability of the polarizing coatings exceeds such temperatures.

Figure 6:
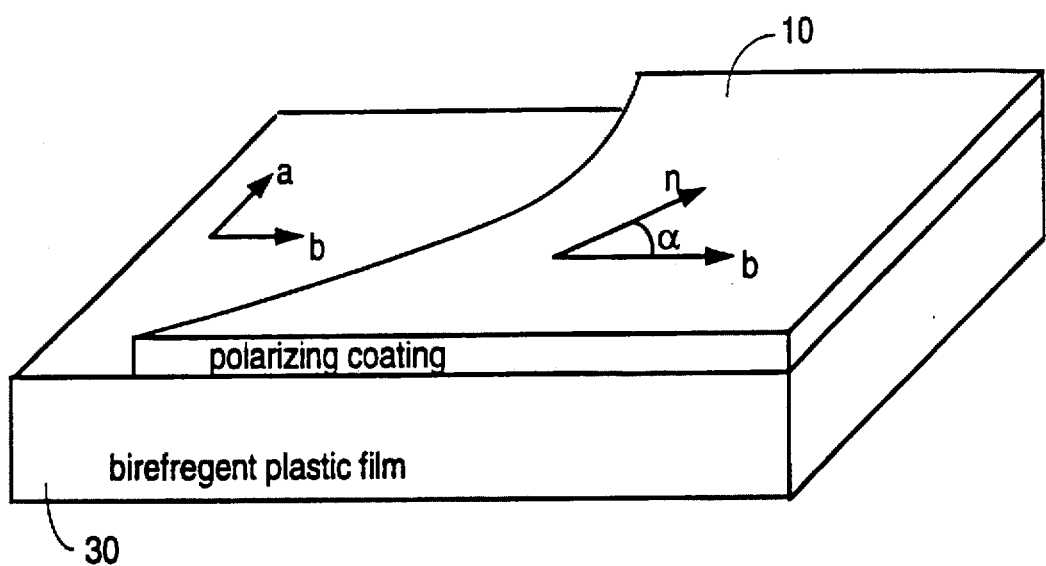
FIG. 6 illustrates a laminated circular polarizing plate.
Figure 6:
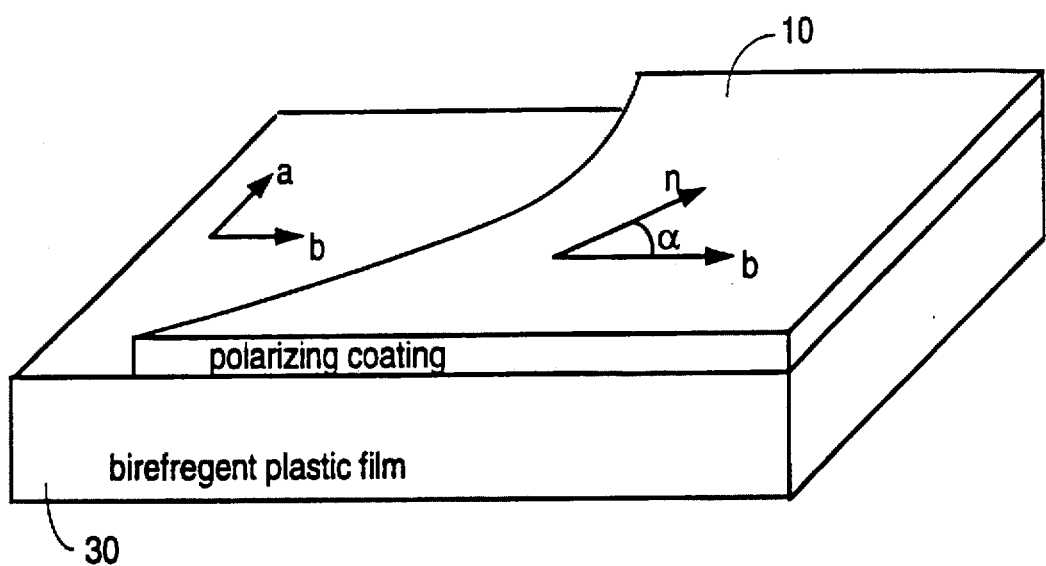

In some embodiments, a birefringent polymeric film (for example, polyethylene terephthalate) is used as a substrate for a polarizing coating in such a way that one of the basic optical axis of the substrate film forms an angle close to 45° with the polarization axis of the coating. FIG. 6 shows coating 10 on birefringent plastic film 30. The arrows "a"

and "b" show respectively the directions of the ordinary and extraordinary axes of film 30. Arrow "n" shows the direction of the polarization axis of polarizing coating 10. Angle α between the polarization axis "n" and the extraordinary axes "b" is about 45° as described above. As a result, a circular film polarizer is obtained. The thickness (d) of polymeric film 30 should meet the following condition:

$$d(n_o - n_e) = \frac{\lambda}{4} + m\frac{\lambda}{2}$$

where $n_o$, $n_e$ are refraction indices of the ordinary and extraordinary rays, λ is the light wavelength, and m=1,2,3 . . . (any positive integer).

Using a circular film polarizer in a laminated composition allows obtaining a circularly polarizing plate which can be used in manufacture of screens to increase the image contrast of displays and TV screens.

Dichroic polarizers as well as laminated materials disclosed herein are distinguished by high thermal stability and excellent lightfastness such that these materials are suitable for use in rough production and operation conditions, for example, in production of antireflective screens for displays and TV screens, in automotive industry in manufacture of laminated windshield glasses, in illuminants, in manufacture of glass for construction and architecture, etc. In addition, the polarizers of the invention can be used in the same areas as known polarizers. See, for example, the aforementioned U.S. Pat. No. 2,544,659 incorporated herein by reference.

The polarizing coatings of the invention advantageously have a high dichroic ratio. (The dichroic ratio is $D_\perp/D_\parallel$ wherein $D_\perp$ is the optical density with respect to light polarized perpendicularly to the polarizing plane of the polarizing coating and $D_\parallel$ is the optical density with respect to light polarized parallel to the polarizing plane.) In some embodiments, the dichroic ratio is about 7.0 or greater, and in some embodiments at least about 8.0, or at least about 10.0, or at least about 11.0, or at least about 12.0, or at least about 22.0, or at least about 23.0.

EXAMPLE 1.

1.1. Synthesis of a dye of the formula I.

50 g of indantrene were dissolved in 200 ml of chlorosulfonic acid and the mixture was stirred at 80°–90° C. for 11–12 hours. After being cooled to room temperature the mixture was diluted in 200 ml of water, and the precipitated product was filtered off with suction. The dyestuff was suspended in 300 ml of concentrated hydrochloric acid, heated at 90° C. for 1 hour, filtered off with suction, washed with concentrated hydrochloric acid and dried. The yield was 39.6 g. The dyestuff obtained had the formula I, R=H, R$^1$=Cl.

The following dyestuffs of formula I were similarly obtained from compounds having formula I but without the sulfonic groups:

R=NHCOC$_6$H$_5$, R$^1$=H;
R=NHCOC$_6$H$_5$, R$^1$=Cl;
R=NHC$_6$H$_5$, R$^1$=Cl;
R=NHC$_6$H$_4$Cl, R$^1$=Cl;
R=CH$_3$, R$^1$=Cl;
R=C$_2$H$_3$, R$^1$=Cl.

1.2 Manufacture of dye liquid crystal;

1.0 g of 4,4'-disulfo-3-chloroindantrene (formula I, R=H, R$^1$=Cl) free from inorganic salts was dissolved in 100 ml of distilled water. The solution was filtered through a "Millipore"-0.1 mkm (micrometer) filter and then concentrated by evaporation on a rotary evaporator to the final concentration of 12 mass. %. The presence of the liquid crystal phase was detected by observation through a polarizing microscope equipped by two crossed polarizers.

1.3. Manufacture of dichroic polarizers:

1.3.1. Applying a polarizing coating on a polyethylene terephtalate (PET) film:

1.3.1.1. Applying by a chink drawplate:

(All experiments on applying polarizing coatings were carried out at 25° C. and a relative humidity of 70%.)

A PET-film having a thickness of 50 mkm, a width of 120 mm and a length of 1000 mm was stacked between a pressing cylinder having a diameter of 40 mm and a length of 200 mm and a drawplate such as drawplate 90 of FIG. 3c. The drawplate had a volume of 5 ml, its chink had a width of 300 mkm and a length of 100 mm. The working surface of the draw plate, especially its edge was carefully polished and had no scratches. LC prepared according to step 1.2 was poured into the drawplate. To improve the wettability of the PET-film, Triton-X-100 was added to the LC, surfactant concentration was 0.2%. The PET-film was pressed to the drawplate surface by the cylinder with a force of about 10 newton. The PET-film was pulled through at a velocity of 150 mm/s. On the film surface an oriented dye layer was formed. After drying, the layer had a transmission $T_0=42\%$, $\lambda_{max}=645$ nm, dichroic ratio $D_\perp/D_\parallel =22.0$.

1.3.1.2. Applying by a doctor in the form of an unrolling cylinder:

A PET-film having a thickness of 50 mkm, a width of 120 mm and a length of 1000 mm was passed between two steel cylinders having a diameter of 20 mm and a length of 200 mm. The surfaces of the cylinders had been carefully polished. The thickness of the formed coating was predetermined by spacers made from a PET-film having a thickness of 60 mkm. The spacers were placed on the edges of one of the cylinders. 2 ml of LC were applied in the form of a band having a width of 5–10 mm onto the PET-film surface directly ahead of the cylinders. Then the PET-film was pulled between the cylinders at a velocity of 150 mm/s. After drying the oriented dye film had the following parameters: $T_0=40\%$, $D_\perp/D_\parallel =21.5$.

1.3.1.3. Applying by a rolling cylinder:

A cylinder having a diameter of 20 mm and a length of 200 mm was placed on a plane surface without possibility to move along it linearly but with a possibility to rotate around the cylinder axis. On the cylinder edges spacers were fixed which were made from a PET-film having a thickness of 10 mkm. One edge of the PET-film was passed between the cylinder and the plane surface. The PET-film had a thickness of 50 mkm, a width of 200 mm and a length of 1000 mm. Ahead of the cylinder about 1 ml of dye-LC was applied on the PET-film. The PET-film was pulled at a velocity of 50 mm/s, so that the rolling cylinder distributed the LC into a uniform layer. After drying the oriented dye film had the following parameters: $T_0=45\%$, $D_\perp/D_{563} =23.0$.

1.3.1.4. Applying by separation of two PET films:

Two cylinders each having a diameter of 20 mm and a length of 200 mm were fixed immovably on a table at a height of 150 mm from the table surface and at a distance of 110 mkm from each other (see FIG. 1b). The cylinders could revolve around their respective axes. Edges of two PET films having a thickness of 50 mkm were passed between the cylinders from below and pulled up 150 mm past the cylinders. 0.5 ml of LC were deposited in the space between the cylinders on the surfaces of both films along the horizontal edges parallel to the cylinders' axes. Both films were simultaneously pulled up at different angles (FIG. 1b) at a velocity of 50 mm/s. After drying the polarizing coatings on the two films had the following parameters: $T_0=45\%$, $D_\perp/D_\parallel =20.0$.

1.3.2. Applying a polarizing coating on a glass plate:

1.3.2.1. Applying by a doctor in the form of a non-revolving cylinder:

A glass plate having a size of 100×100 mm² and a thickness of 2 mm was carefully washed and then dried. 1 ml of dye LC was deposited in the form of a band along an edge of the plate at a distance of 20 mm from the edge. The plate was fixed on the platform which could move linearly. A doctor in the form of a non-revolving cylinder having a diameter of 20 mm and a length of 200 mm was pressed to the plate. The cylinder axis was parallel to the edge along which the LC was deposited. The thickness of the dye layer was predetermined by two spacers each having a thickness of 10 mkm and a width of 5 mm which were fixed at a distance of 80 mm from each other on the cylinder. The platform with the fixed plate moved at a velocity of 150 mm/s in the direction perpendicular to the cylinder axis. An oriented dye layer was formed on the surface of the glass plate which after drying had the following parameters: $T_0=43\%$, $D_\perp/D_\parallel =22.0$.

1.3.2.2. Applying by a rolling cylinder:

A prepared glass plate was fixed on a movable platform as described in the preceding example. Dye LC was deposited at a distance of 20 mm from one edge of the plate. Two PET-film spacers having a thickness of 10 mkm and a width of 5 mm were fixed on longitudinal edges of the plate. These spacers determined the thickness of the polarizing coating. A cylinder able to revolve around its axis and having a diameter of 20 mm and a length of 200 mm was placed on the plate edge along which the LC had been applied. The platform moved at a velocity of 20 mm/s relative to the cylinder so that the cylinder was rolling along the plate surface. Eventually the dye LC was uniformly distributed and oriented on the plate surface. After drying the oriented dye film had the following parameters: $T_0=44\%$, $D_\perp/D_\parallel = 22.5$.

1.3.2.3. Applying by peeling a PET film off a glass plate:

A prepared glass plate having a size of 60×50 mm² and a thickness of 2 mm was fixed on a platform. Two spacers each having a thickness of 10 mkm, a width of 5 mm and a length of 70 mm were placed on the longitudinal edges of the plate. 0.3 ml of LC were applied in the form of a band on a transverse edge of the plate. Then the plate was covered by a PET film having a width of 80 mm, a length of 100 mm and a thickness of 20 mkm. The LC under the PET film was distributed fully along a plate surface by a roller having a diameter of 20 mm and a length of 100 mm. Then the PET film was peeled off beginning at one of the transverse edges at a velocity of 50 mm/s. See FIG. 1a. After drying the polarizing coating on the plate had the following parameters: $T_0=45\%$, $D_\perp/D_\parallel =22.0$.

EXAMPLE 2.

1.5 g of N,N'-diphenyldiimide of 1,4,5,8-naphtalenetetracarbonic acid were dissolved in 15 ml of 15–20% oleum. The mixture was then heated to 50° C. and stirred at this temperature for 4–5 hours to the water-solubility test, that is, until the mixture became water-soluble. Then it was cooled to room temperature and poured onto ice. The precipitated dyestuff was filtered off with suction, washed with concentrated hydrochloric acid to separate off sulfo ions and dried. The yield was 1.7 g. This gave the dyestuff of the formula II, A=a, Ar=$C_6H_5$, n=2.

The following dyestuffs were prepared as in Example 2 from compounds having corresponding formulas but without sulfonic groups (n=0):

Formula II:

A=a, Ar=4-$ClC_6H_4$;

A=b, R=3-$CH_3$;

A=b, R=4-$C_2H_5$;

A=b, R=4-Br;

A=b, R=4-Cl;

A=b, R=4-CH$_3$O;
A=b, R=4-C$_2$H$_5$O;
Formula III:
A=a, Ar=C$_6$H$_5$;
A=a, Ar=4-C$_2$H$_5$OC$_6$H$_4$;
A=a, Ar=4-CH$_3$OC$_6$H$_4$;
A=a, Ar=4-ClC$_6$H$_4$;
A=a, Ar=3-CH$_3$C$_6$H$_4$;
A=a, Ar=4-C$_4$H$_9$C$_6$H$_4$;
A=b, R=H;
A=b, R=4-CH$_3$;
A=b, R=4-Cl;
A=b, R=4-Br;
A=b, R=4-C$_2$H$_5$;
Formula IV:
A=a, Ar=C$_6$H$_5$;
A=a, Ar=4-CH$_3$OC$_6$H$_4$;
A=a, Ar=4-Cl-C$_6$H$_4$;
A=a, Ar=4-C$_2$H$_5$OC$_6$H$_4$;
A=b, R=H;
A=b, R=4-CH$_3$;
A=b, R=4-C$_2$H$_5$;
A=b, R=3-Br;
A=b, R=3-Cl.

EXAMPLE 3.

1.5 g of N,N'diphenyldiimide of 3,4,9,10-perylenetetracarbonic acid were dissolved in 6 ml of chlorosulfonic acid together with 3 ml of 15-20% oleum and the mixture was stirred at 80°-90° C. for 3 hours. After being cooled to room temperature, the mixture was poured onto ice. The product was filtered off with suction, dissolved in 300 ml of water and subjected to dialysis to separate off inorganic acids. The dyestuff solution obtained was then evaporated, and the residue was dried. The product weighed 1.74 g and had the formula III, A=a, Ar=C$_6$H$_5$. See also German Pat. No. 3703513.4 incorporated by reference herein.

A 98-100% sulfuric acid can be used instead of oleum.

The following dyestuffs were obtained similarly from compounds having corresponding formulas but without sulfonic groups (n=0):

Formula III:
A=a, Ar=C$_6$H$_5$;
A=a, Ar=4-CH$_3$OC$_6$H$_4$;
A=a, Ar=4-C$_2$H$_5$OC$_6$H$_4$;
A=a, Ar=4-Cl-C$_6$H$_4$;
A=b, R=H;
A=b, R=4-CH$_3$;
II: A=b, R=H;
A=b, R=4-CH$_3$;
A=b, R=3-Cl;
IV: A=b, R=H;
A=b, R=4-C$_3$;
A=b, R=3-Br.

EXAMPLE 4.

35 g of dibenzimidasole 1,1'-binaphthyl-4,4',5,5', 8,8'-hexacarbonic acid were dissolved in 100 ml of 20% oleum and the mixture was stirred at 110°-115° C. After about 7 hours the reaction was completed.

135 ml of water were added dropwise into the cooled solution. The precipitated dyestuff was filtered off with suction, dissolved in water and subjected to dialysis to separate off inorganic acids. The obtained dyestuff solution was then evaporated, and the residue was dried. The yield was 35.2 g. The dyestuff had the structure of the formula IV, A=b,R=H, n=2-3.

The following dyestuffs were obtained similarly from corresponding compounds without sulfonic groups (n=0):

Formula IV:
A=b, R=3-Br;
A=b, R=3-Cl;
A=b, R=4-C$_3$;
A=b, R=4-C$_2$H$_5$.

EXAMPLE 5.

5 g of quinacridone were stirred in 20 ml of 98-100% sulfuric acid at room temperature for 5 hours. The mixture was poured onto ice. The precipitated dyestuff was filtered off by suction and washed carefully to neutral with ethanol/ 10% strength ammonium carbonate solution mixture. This gave 6 g of ammonium salt of dyestuff of formula VI (see also U.S. Pat. No. 3,386,843 hereby incorporated herein by reference), n=2.

The dyestuff of formula VII, n=2 was obtained similarly from the corresponding compound having n=0.

Characteristics of polarizing coatings obtained on glass with dyes disclosed herein (all dyes are in the form of ammonium salts) are given in Table 1.

In summary, the claimed water soluble organic dyes of I-VII type and their mixtures are able to form a stable lyotropic liquid crystalline state in a wide range of concentrations, temperatures, and pH-values. These dyes allow:

obtaining polarizing coatings on any surface, both hydrophylic and hydrophobic, without a preliminary orientation of the surface by rubbing;

combining the orienting influence and LC application into one stage;

obtaining lightfast polarizing coatings of 5-7 rating (against 1-2 in prior art);

obtaining thermally resistant (up to 200°-300° C.) polarizing coatings (against 80°-120° C. in prior art);

obtaining polarizing coatings with good polarizing characteristics (a dichroic ratio of 10-27 against 3 in prior art);

using standard equipment to obtain uniform polarizing coatings.

TABLE 1

The performance data of polarizing coatings obtained with claimed compositions.

| | The performance data | | | |
|---|---|---|---|---|
| No. | Dyestuff | Color | $\lambda_{max}$ nm | Dichroic ratio $D_1/D_1$ |
| 1 | formula I,(R=H, R$^1$=Cl) | blue | 645 | 23.0 |
| 2 | II,A=b,cis-trans isomer | orange | 480 | 10.0 |
| 3 | III,A=a,R=4—CH$_3$O— | red | 510 | 10.0 |
| 4 | III,A=b,R=H | red | 500 | 10.0 |
| 5 | III,A=a,R=3—CH$_3$— | red | 515 | 12.0 |
| 6 | IV,A=b,R=H | reddish-grey | 600 | 11.0 |
| 7 | IV,A=a,R=4—CH$_3$— | greenish-grey | 590 | 11.0 |
| 8 | IV,A=a,R=H | reddish- | 600 | 12.0 |

TABLE 1-continued

The performance data of polarizing coatings obtained with claimed compositions.

| No. | Dyestuff | Color | $\lambda_{max}$ nm | Dichroic ratio $D_1/D_1$ |
|---|---|---|---|---|
| 9 | IV,A=b,R=4—CH$_3$— | grey greenish-grey | 595 | 11.5 |
| 10 | IV,A=b,R=H | bluish-grey | 580 | 12.0 |
| 11 | V | yellow | 410 | 10.0 |
| 12 | I,R=R$^1$=H | blue | 650 | 12.0 |
| 13 | VI,R=R$^1$=H | red | 510 | 10.0 |
| 14 | VII | violet | 580 | 10.0 |
| 15 | V + I(R=H,R$^1$=Cl) (1:1.6) | green | 420 650 | 7.0 12.0 |
| 16 | III(A=a,R=4—CH$_3$—) + I(R=H,R$^1$=Cl) (1:1.5) | violet | 520 650 | 8.0 15.0 |
| 17 | II(A=b,R=H) + I(R=H,R$^1$=Cl) (1:4.0) | bluish-grey | 500 650 | 9.0 17.0 |
| 18 | II(A=b,R=H) + III(A=a,R=4—CH$_3$O) + I(R=H,R$^1$=Cl) (1:0.5:3.0) | reddish-grey | 520 650 | 8.0 16.0 |
| 19 | Methylene Blue (prior art) I. | blue | 660 | 3.0 |

We claim:

1. A dichroic light-polarizing element comprising:
   a support surface; and
   a plurality of supra-molecular complexes formed from one or more organic dyestuffs of the formula:

(SO$_3$M)$_n$ wherein M is a cation;
   the plurality of supra-molecular complexes oriented in a direction on the support surface so as to polarize light transmitted through the plurality of supra-molecular complexes.

2. The dichroic light-polarizing element of claim 1 wherein at least one of the one or more dyestuffs has the formula:

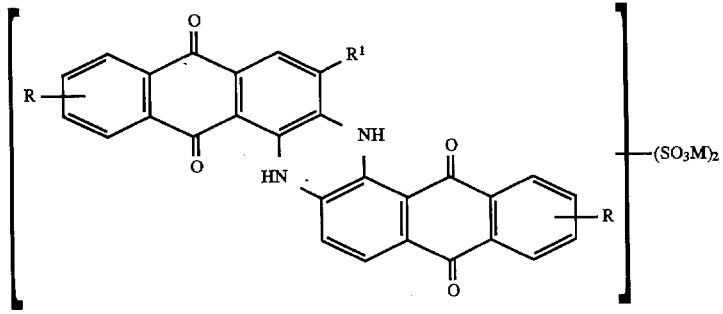

wherein:
R$^1$=H or Cl;
R=H, Alk, ArNH, or ArCONH;
Alk is an alkyl group; and
Ar is a substituted or unsubstituted aryl radical.

3. The dichroic light-polarizing element of claim 1 wherein at least one of the one or more dyestuffs has the formula:

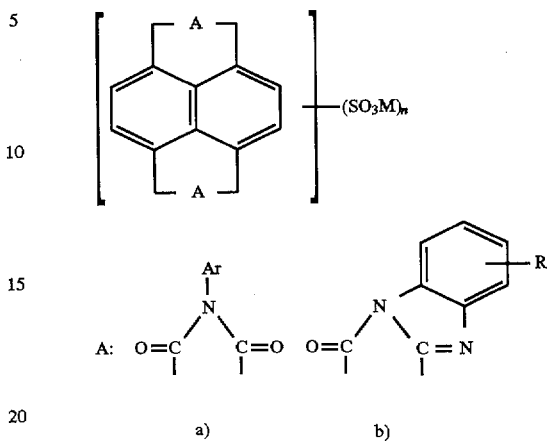

a)    b)

wherein
R is H, an alkyl group, a halogen, or an alkoxy group;
Ar is a substituted or unsubstituted aryl radical; and
n=2 or 3.

4. The dichroic light-polarizing element of claim 1 wherein at least one of the one or more dyestuffs has the formula:

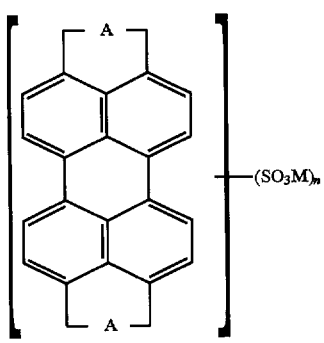

-continued

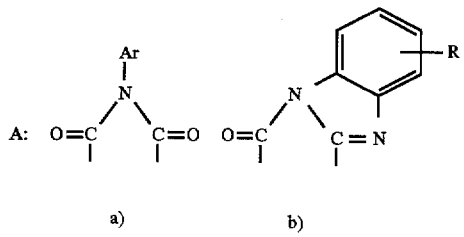

wherein:

R is H, an alkyl group, a halogen, or an alkoxy group;

Ar is a substituted or unsubstituted aryl radical; and n=2 or 3.

5. The dichroic light-polarizing element of claim 1 wherein at least one of the one or more dyestuffs has the formula:

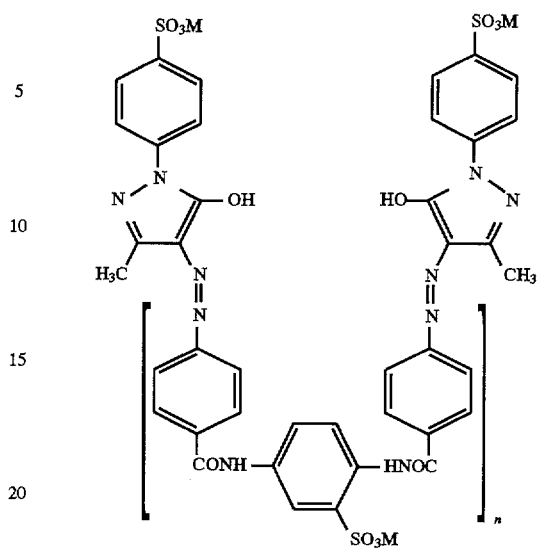

wherein n=3, 4 or 5.

7. The dichroic light-polarizing element of claim 1 wherein at least one of the one or more dyestuffs has the formula:

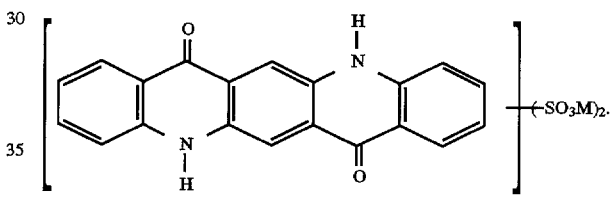

8. The dichroic light-polarizing element of claim 1 wherein at least one of the one or more dyestuffs has the formula:

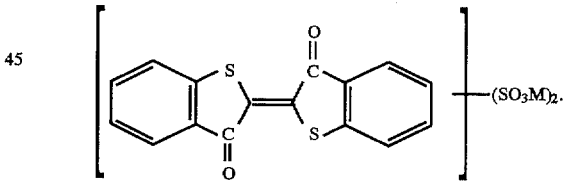

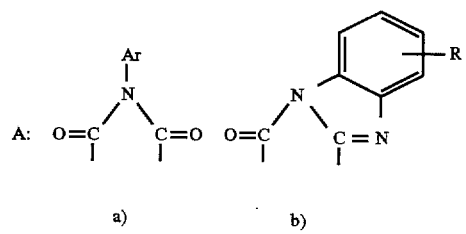

wherein:

R is H, an alkyl group, a halogen, or an alkoxy group;

Ar is a substituted or unsubstituted aryl radical; and n=2 or 3.

6. The dichroic light-polarizing element of claim 1 wherein at least one of the one or more dyestuffs has the formula:

9. The dichroic light-polarizing element of one of claim 1 wherein M is $H^+$, a metal of the first group, or $NH_4^+$.

10. The dichroic light-polarizing element of claim 9 wherein M is $H^+$, $Li^+$, $Na^+$, $K^+$, $Cs^+$, $NH_4^+$.

11. A dyestuff having the formula:

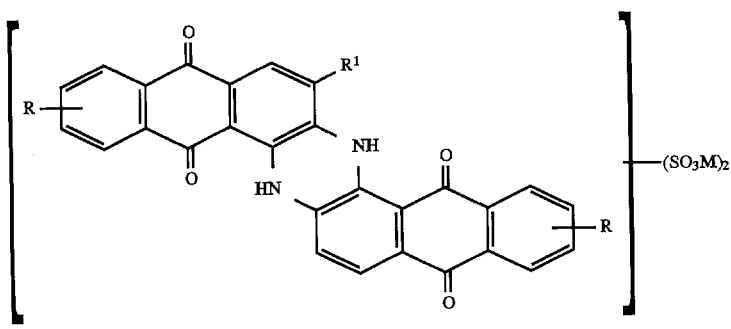

wherein:

$R^1$=H and R=Alk, ArNH, or ArCONH; or $R^1$=Cl and R=H, Alk, ArNH, or ArCONH;

Alk is an alkyl group with 1 to 4 carbon atoms;

Ar is a substituted or unsubstituted aryl radical; and

M is a cation.

12. A dyestuff having the formula:

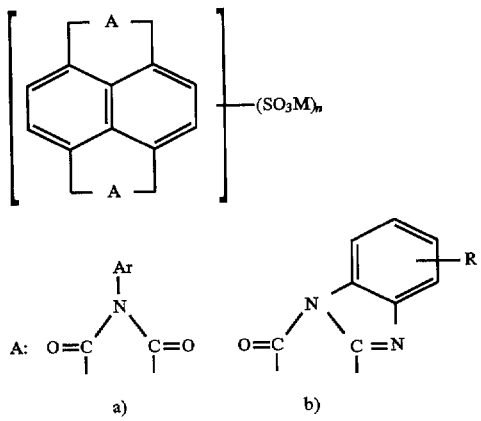

wherein

R is H, an alkyl group, a halogen, or an alkoxy group;

Ar is a substituted or unsubstituted aryl radical;

n=2 or 3; and

M is a cation.

13. A dyestuff having the formula:

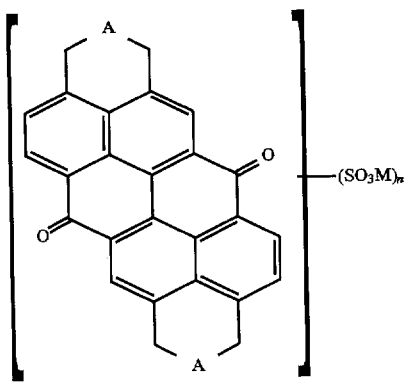

-continued

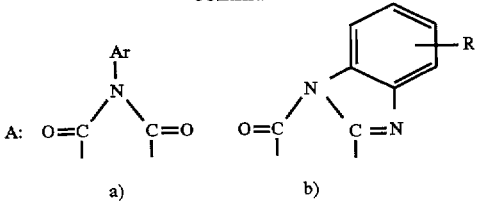

wherein:

R is H, an alkyl group, a halogen, or an alkoxy group;

Ar is a substituted or unsubstituted aryl radical;

n=2 or 3; and

M is a cation.

14. A dyestuff having the formula:

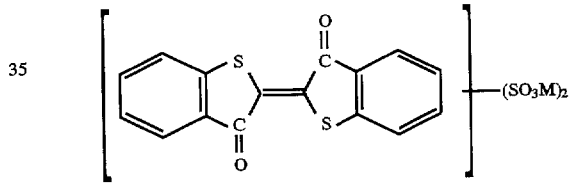

wherein M is a cation.

15. A lyotropic liquid crystal comprising a solution of: water and/or a water-miscible solvent; and one or more dyestuffs selected from the group comprising formula I through and including formula VII, wherein the total concentration of the one or more dyestuffs is in the range of approximately 5 mass percent to approximately 25 mass percent.

16. The lyotropic liquid crystal solution of claim 15 wherein the one or more dyestuffs are selected from the group comprising formula I, formula III, formula IV and formula V, and wherein the total concentration of the one or more dyestuffs is in the range of approximately 8 mass percent to approximately 12 mass percent.

17. The lyotropic liquid crystal solution of claim 15 wherein the one or more dyestuffs are selected from the group comprising formula II, formula VI and formula VII, and wherein the total concentration of the one or more dyestuffs is in the range of approximately 16 mass percent to approximately 20 mass percent.

18. The dichroic light-polarizing element of claim 1, wherein each of the plurality of supra-molecular complexes further comprises a longitudinal axis, and wherein molecular planes and moments of electron transition of the one or more organic dyestuffs are oriented approximately perpendicular to the longitudinal axis.

19. The dichroic light-polarizing element of claim 2 wherein Ar is a substituted or unsubstituted phenyl radical.

20. The dichroic light-polarizing element of claim 3 wherein Ar is a substituted or unsubstituted phenyl radical.

21. The dichroic light-polarizing element of claim 4 wherein Ar is a substituted or unsubstituted aryl radical.

22. The dichroic light-polarizing element of claim 5 wherein Ar is a substituted or unsubstituted aryl radical.

23. The dyestuff of claim 11 wherein Ar is a substituted or unsubstituted phenyl radical.

24. The dyestuff of claim 12 wherein Ar is a substituted or unsubstituted phenyl radical.

25. The dyestuff of claim 13 wherein Ar is a substituted or unsubstituted phenyl radical.

26. A liquid crystalline cell comprising:

a liquid crystal material; and a dichroic light-polarizing element, the dichroic light polarizing element further comprising a support surface wherein a plurality of supra-molecular complexes formed from one or more organic dyestuffs of the formula:

$(SO_3M)_n$ wherein M is a cation, are oriented in a direction on the support surface so as to polarize light transmitted through the plurality of supra-molecular complexes, and wherein the dichroic light-polarizing element has an orienting influence on the liquid crystal material.

27. The dichroic light-polarizing element of claim 1 further comprising a birefringent film having a basic optical axis, wherein the basic optical axis forms an angle of approximately 45° with a major axis of polarization of the light-polarizing element.

28. The dichroic light-polarizing element of claim 1 wherein the one or more organic dyestuffs have a dichroic ratio of at least approximately 7.

29. The dichroic light-polarizing element of claim 1 wherein the one or more organic dyestuffs are organic dyestuffs selected from the group Formula I, Formula III, Formula VI and Formula VII, and wherein the one or more organic dyestuffs have a dichroic ratio of at least 10.

* * * * *

UNITED STATES PATENT AND TRADEMARK OFFICE
CERTIFICATE OF CORRECTION

PATENT NO. : 5,739,296
ISSUE DATE : 04/14/98
INVENTOR(S) : Gvon, Khan I.; Bobrov, Yuri A.; Bykov, Victor A.; Ignatov, Leonid Y.; Ivanova, Tatiana D.; Popov, Sergei I.; Shishkina, Elena Y.; Vorozhtsov, Georgiy N.

It is certified that errors appear in the above-identified patent and that said Letters Patent is hereby corrected as shown below:

| | |
|---|---|
| Col. 15, line 35 | after "or more" insert --water soluble--. |
| Col. 15, line 37 | before "$(SO_3M)_n$," insert --{Chromogen}--. |
| Col. 15, line 39 | replace "wherein M is a cation" with --wherein Chromogen is an organic dyestuff, M is a cation, and n is 2 to 5--. |
| Col. 19, line 17 | before "or" insert -- Alk is an alkyl group with 2 to 4 carbon atoms; Ar is a substituted or unsubstituted aryl radical;--. |
| Col. 20, line 44 | replace "comprising" with --consisting of--. |
| Col. 21, line 18 | after "or more" insert --water soluble--. |
| Col. 21, line 20 | before "$(SO_3M)_n$," insert --{Chromogen}--. |
| Col. 22, line 1 | replace "wherein M is a cation" with --wherein Chromogen is an organic dyestuff, M is a cation, and n is 2 to 5--. |

Signed and Sealed this

Fourth Day of May, 1999

Q. TODD DICKINSON

*Attest:*

*Attesting Officer*     Acting Commissioner of Patents and Trademarks